United States Patent
Sbuell et al.

(10) Patent No.: US 8,737,947 B2
(45) Date of Patent: May 27, 2014

(54) TRANSPONDER POWER SUPPLY, A TRANSPONDER AND A METHOD FOR PROVIDING A TRANSPONDER POWER SUPPLY CURRENT

(75) Inventors: Richard Sbuell, Graz (AT); Thomas Baglin, Graz (AT); Raimondo Luzzi, Graz (AT); Marco Bucci, Graz (AT)

(73) Assignee: Infineon Technologies AG, Neubiberg (DE)

( * ) Notice: Subject to any disclaimer, the term of this patent is extended or adjusted under 35 U.S.C. 154(b) by 164 days.

(21) Appl. No.: 12/868,984

(22) Filed: Aug. 26, 2010

(65) Prior Publication Data

US 2012/0052798 A1    Mar. 1, 2012

(51) Int. Cl.
H04B 1/16    (2006.01)
H04W 52/52    (2009.01)

(52) U.S. Cl.
CPC ..................... *H04W 52/52* (2013.01)
USPC ........................ 455/343.1; 455/572

(58) Field of Classification Search
CPC .......... H04W 52/029; H04W 52/0225; H04W 52/0216; H04W 52/0245; H04W 52/0277; H04W 52/52; G08B 29/181; G06K 19/0723; G06K 19/0701; H03G 3/3042; H03G 3/3047; H03F 3/24; H03F 1/56; H04B 1/406; H04B 1/3883; H04M 1/0262; H04M 19/08; Y02E 60/12
USPC ............................ 455/127.1–127.5, 572–574, 455/343.1–343.5; 307/66, 64, 48, 104
See application file for complete search history.

(56) References Cited

U.S. PATENT DOCUMENTS

| | | | | |
|---|---|---|---|---|
| 5,583,753 A * | 12/1996 | Takayama | ........................ | 363/71 |
| 5,650,669 A * | 7/1997 | Aldous | ...................... | 455/127.2 |
| 5,784,626 A * | 7/1998 | Odaohara | ........................ | 307/66 |
| 6,153,949 A * | 11/2000 | Soderhall | ........................ | 307/125 |
| 6,992,468 B2 * | 1/2006 | Kranz | ........................... | 323/283 |
| 7,245,888 B2 * | 7/2007 | Sointula | ...................... | 455/127.5 |
| 7,420,411 B2 * | 9/2008 | Herzinger et al. | .......... | 455/127.1 |
| 7,580,694 B2 | 8/2009 | Rizzo et al. | | |
| 7,868,481 B2 * | 1/2011 | Sbuell et al. | ..................... | 307/66 |
| 8,400,279 B2 | 3/2013 | Koyama et al. | | |
| 2003/0156436 A1 * | 8/2003 | Moreaux et al. | ................. | 363/49 |
| 2008/0100263 A1 | 5/2008 | Nagatsuka et al. | | |
| 2009/0026601 A1 * | 1/2009 | Otremba et al. | .............. | 257/690 |
| 2009/0127934 A1 | 5/2009 | Sbuell et al. | | |
| 2009/0128354 A1 | 5/2009 | Sbuell et al. | | |
| 2009/0160046 A1 * | 6/2009 | Otremba et al. | .............. | 257/700 |
| 2010/0207584 A1 * | 8/2010 | Spartano et al. | .............. | 320/135 |
| 2011/0193420 A1 | 8/2011 | Ishida et al. | | |
| 2011/0201391 A1 * | 8/2011 | Mankaruse et al. | .......... | 455/572 |
| 2012/0153742 A1 | 6/2012 | Lee et al. | | |

FOREIGN PATENT DOCUMENTS

DE    102008056192 A1    5/2009

* cited by examiner

*Primary Examiner* — Lana N Le
(74) *Attorney, Agent, or Firm* — Murphy, Bilak & Homiller, PLLC

(57) ABSTRACT

A transponder power supply for providing a supply current based on an antenna input signal. The transponder power supply comprises an emergency circuit comprising a charging circuit, an emergency capacitor, and an output stage. The charging circuit is configured to charge the emergency capacitor based on the antenna input signal to a maximum voltage which is higher than a voltage of the antenna input signal. The output stage is configured to provide a contribution to the supply current using a charge of the emergency capacitor.

8 Claims, 9 Drawing Sheets

TRANSPONDER POWER SUPPLY, A TRANSPONDER AND A METHOD FOR PROVIDING A TRANSPONDER POWER SUPPLY CURRENT

FIELD OF THE INVENTION

Embodiments of the present invention relate to transponder power supplies, a transponder, and methods for providing a transponder power supply.

BACKGROUND

In case of proximity contactless chip cards (for example radio frequency identification (RFID)—transponders) energy as well as information is transferred over an inductively coupled antenna interface. Information from a so-called reader (PCD—proximity coupling device) to a chip card or a transponder (PICC—proximity integrated circuit card) is typically transferred by amplitude modulations and by load modulations in the other direction from the PICC to the PCD. The communication for the 13.56 MHz ISO 14443 standard is defined by A/B/C/standards.

By using the type A Standard, amplitude modulation with a modulation index of up to 100% is used. A single bit is coded as a field pause. During the pause, the field emitted by the PCD antenna is reduced by the modulation index. With a modulation index of 100%, the field emitted by the PCD antenna is turned off during a type A pause. A 100% type A pause can last several microseconds. As the emitted field of the PCD antenna is also used to transfer energy to the PICC, the PICC is not supplied with energy during this time interval.

Therefore an energy reservoir (for example, a capacitor) is sometimes added to the PICC, to provide the amount of energy consumed by the PICC circuitry during the above-mentioned type A gap or type A pause or field pause.

As the capacitor which is used, or even required in some cases, for surviving the longest type A gap possible (which is defined in the ISO 14443 Standard) is quite large, this capacitor significantly increases the area of the analog frontend of the contactless chip card or RFID transponder.

There is a desire in the art for providing a concept, which allows for a more efficient implementation of a power supply for transponders.

SUMMARY

Embodiments of the present invention provide a transponder power supply for providing a supply current based on an antenna input signal. The transponder power supply comprises an emergency circuit. The emergency circuit comprises a charging circuit, an emergency capacitor and an output stage. The charging circuit is configured to charge the emergency capacitor based on the antenna input signal to a maximum voltage, which is higher than a voltage of the antenna input signal. The output stage is configured to provide a contribution to the supply current using a charge of the emergency capacitor.

Further embodiments of the present invention provide a transponder power supply for providing a supply current based on an antenna input signal. The transponder power supply comprises an emergency circuit. The emergency circuit comprises a charging circuit, an emergency capacitor and an output stage. The charging circuit is configured to charge the emergency capacitor based on the antenna input signal. The output stage comprises a step down converter circuit configured to provide a contribution to the supply current using a charge of the emergency capacitor.

Those skilled in the art will recognize additional features and advantages upon reading the following detailed description, and upon viewing the accompanying drawings.

BRIEF DESCRIPTION OF THE DRAWINGS

Embodiments of the present invention will be described in the following, referring to the accompanying figures, wherein.

DETAILED DESCRIPTION

Before embodiments of the present invention are explained in greater detail in the following taking reference to the figures, it is to be pointed out that the same or functionally equal elements are provided with the same reference numbers, and that a repeated description of these elements will be omitted. Hence, the description of elements provided with the same reference number is mutually interchangeable and/or applicable in the various embodiments.

Figure 1:
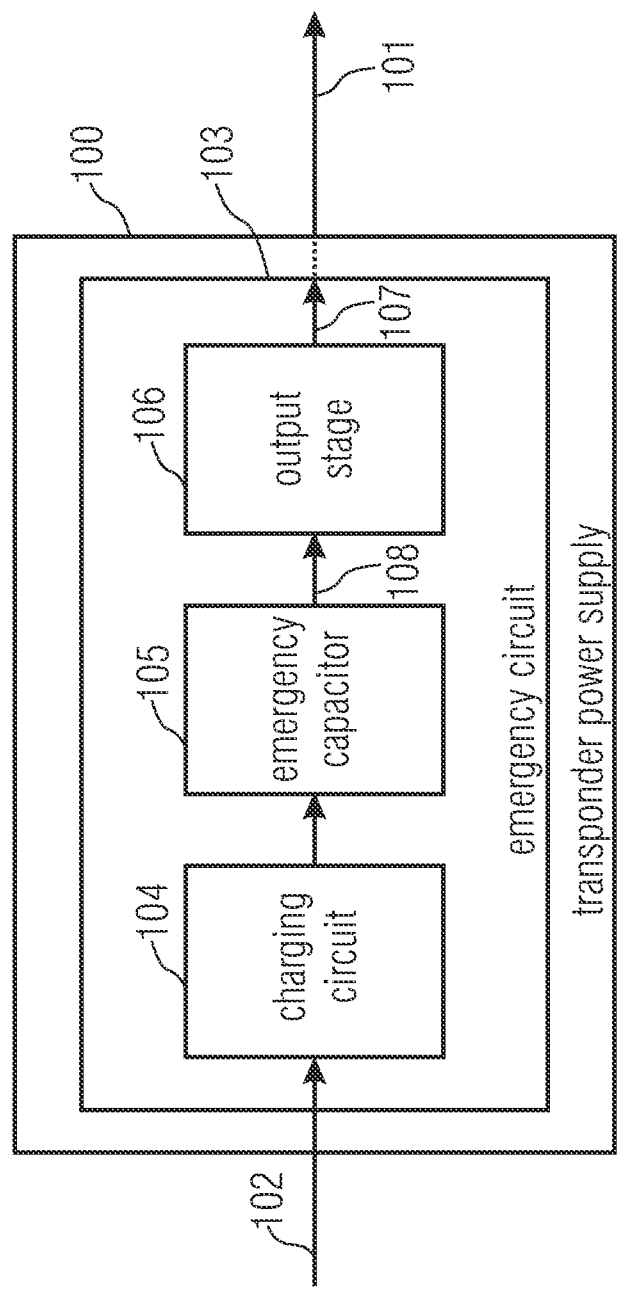
FIG. 1 shows a block diagram of a transponder power supply according to an embodiment of the present invention.

FIG. 1 shows a block diagram of a transponder (e.g. contactless chip card) power supply 100 according to an embodiment of the present invention.

The transponder power supply 100 for providing a supply current 101 based on an antenna input signal 102 comprises an emergency circuit 103.

The emergency circuit may, in the following, also be called EMC module or EMC block.

The emergency circuit 103 comprises a charging circuit 104, an emergency capacitor 105, and an output stage 106. The charging circuit 104 is configured to charge the emergency capacitor 105 based on the antenna input signal 102 to a maximum voltage, which is higher than a voltage of the antenna input signal 102. For example, the charging circuit 104 may be configured to charge the emergency capacitor 105 to a voltage, which is higher than a peak voltage of the antenna input signal 102. The output stage 106 is configured to provide a contribution 107 to the supply current 101, using a charge 108 of the emergency capacitor 105.

A voltage of the antenna input signal 102 is in the following also called antenna voltage.

Within the present application the term transponder may designate a device comprising an receiver circuit or a transceiver circuit coupled to an antenna, which is able to generate a supply voltage and/or a supply current for the receiver circuit or the transceiver circuit based on an antenna input signal. A transponder may for example be an RFID-transponder, e.g. a wireless contactless chip card, which is configured to communicate with a reader through a wireless communication link and to generate a supply voltage and/or supply current based on a (magnetic) field generated by the reader. The (magnetic) field generated by the reader can also be used to transfer data. A typical transponder may not comprise a battery. However, there may be use cases, in which a transponder comprises a battery and in which the above mentioned emergency circuit 103 may be used in a case of an empty battery or similar cases.

It is an idea of embodiments of the present invention that an efficient implementation of a transponder power supply can be achieved if the voltage at the emergency capacitor 105 can be increased to be higher than the voltage of the antenna input signal 102. It has been found that by increasing the voltage at the emergency capacitor 105 above the (maximum) voltage of the antenna input signal 102, the capacitance and as a result the size of the emergency capacitor 105 can be reduced (compared to the case in which the maximum voltage at the emergency capacitor is equal to a maximum voltage of an antenna input signal) by keeping the amount of charge stored in the emergency capacitor 105, or in other words, while avoiding a reduction of the amount of energy stored in the emergency capacitor 105. Embodiments of the present invention therefore enable an optimal usage of the emergency capacitor 105 by charging the emergency capacitor 105 to its maximum possible voltage, and therefore, bringing more charge into the same capacitor than in the case where the capacitor is only charged to a voltage below its maximum voltage (e.g. to a voltage equal to the maximum voltage of an antenna input signal).

In typical conventional transponder power supplies, a voltage of the transponder input signal 102 may be limited to 5 V. However it has been found that medium voltage capacitors may be typically charged up to about 7 V. Therefore the charging circuit 104 may charge the emergency capacitor 105 to 7 V, even if the maximum voltage of the antenna input signal 102 is below 7 V. Furthermore, the voltage of the antenna input signal 102 significantly decreases if the distance between the PCD (the transponder) and the PICC (the transponder reader) increases (so called weak field supply case). In other words, the voltage of the antenna input signal 102 is strongly dependent on the distance between transponder and transponder reader.

The voltage of the antenna input signal 102 may therefore be even below the above mentioned 5 V, but by using the transponder power supply 100 shown in FIG. 1, the emergency capacitor 105 may also be charged to its maximum voltage (e.g. to 7V).

It's an advantage of some embodiments of the present invention that by charging the emergency capacitor 105 to a higher voltage than the antenna input signal 102, more charge may be stored in the same capacitor than in concepts where the voltage of the emergency capacitor equals the voltage of the antenna input signal and/or a size of the emergency capacitor 105 may be smaller than a size of emergency capacitors in circuits based on concepts wherein the voltage of the capacitor equals or is below the voltage of the antenna input signal.

Embodiments of the present invention therefore create a concept which allows for a smaller emergency capacitor and/or a longer abovementioned type A gap or field pause within transponders, such as contactless chip cards.

The contribution 107 to the supply current 101, which is provided by the output stage 106, may be the main part, or even the exclusive part, of the supply current 101 consumed by a connected digital chip load, for example, during a field pause, in which a regular power supply configured to deliver another contribution to the supply current 101 cannot deliver sufficient current to the digital chip load.

Figure 2:
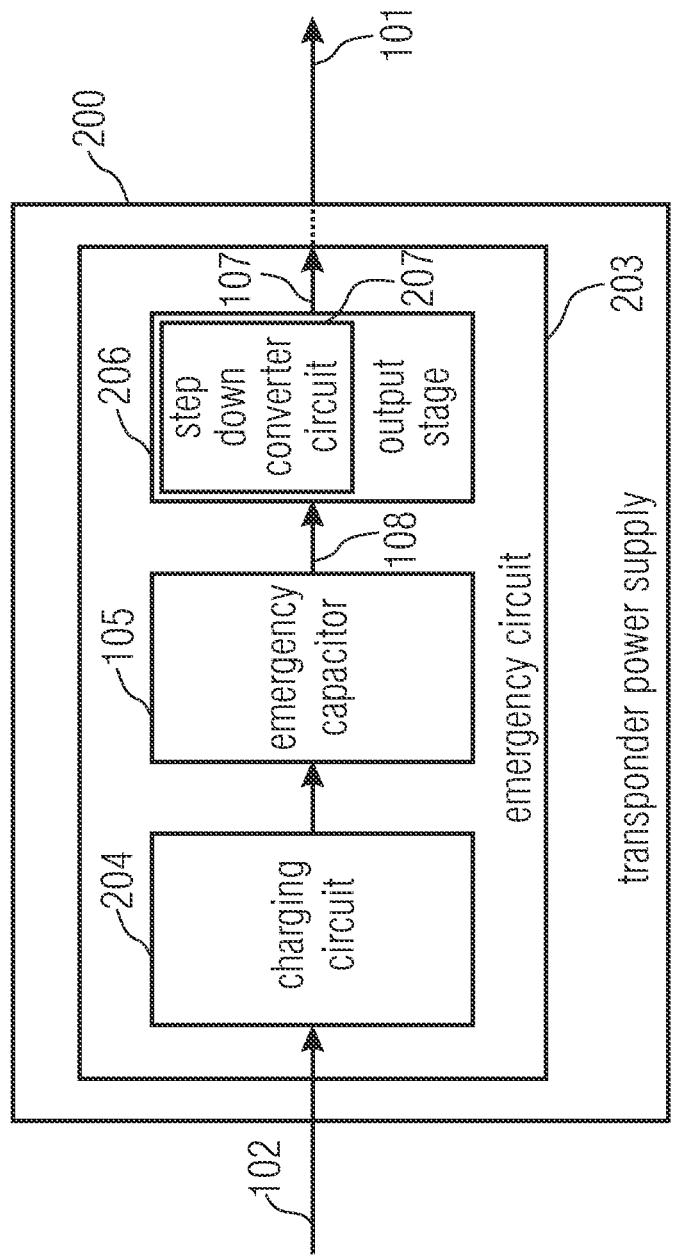
FIG. 2 shows a block diagram of a transponder power supply according to a further embodiment of the present invention.

FIG. 2 shows a transponder power supply 200 according to a further embodiment of the present invention. The transponder power supply 200 for providing a power supply current 101 based on an antenna input signal 102, comprises an emergency circuit 203. The emergency circuit 203 comprises a charging circuit 204, an emergency capacitor 105, and an output stage 206. The charging circuit 204 is configured to charge the emergency capacitor 105 based on the antenna input signal 102. The output stage 206 comprises a step down converter circuit 207 configured to provide a contribution 107 to the supply current 101 using a charge 108 of the emergency capacitor 105.

It is another idea of some embodiments of the present invention that a more efficient concept for a transponder power supply can be provided if the contribution 107 to the supply current 101 is provided using the step down converter circuit 107.

It is an effect of some embodiments of the present invention that a voltage at the emergency capacitor 105 can be converted to a power supply voltage, which is lower than the voltage at the emergency capacitor 105, using the step down converter circuit 207. It has been found that, in comparison to a linear approach, the energy transfer from the medium voltage domain (for example, around 5 V or up to 7V) to a low voltage domain (for example, 1.4 V) is therefore more efficient and less energy is wasted during the charge transfer. It has been found that in a continuous linear discharge approach the energy lost by the charge transfer itself is typically proportional to the voltage difference between the voltage at the emergency capacitor and the required supply voltage. It has been found that due to this fact, the continuous linear discharge approach is very inefficient compared to the concept shown in FIG. 2, in which the step down converter circuit 207 is used to provide the contribution 107 to the power supply current 101.

The step down converter circuit 207, may for example, be a switched capacitor step down converter circuit configured to provide a step down output voltage (the power supply voltage) based on a switching between a serial connection of at least two step down capacitors and a parallel connection of the at least two step down capacitors.

By transferring charge from the medium voltage level at the emergency capacitor 105 to the low voltage level at an output terminal of the output stage 206, which may also be an output terminal of the emergency circuit 203, by using the step down converter circuit 207, less energy is wasted, and therefore the charge in the emergency capacitor 105 may last longer and therefore a field pause may be longer than in concepts in which no step down converter circuit is used. Furthermore, due to the fact that less energy is wasted during the charge transfer, the emergency capacitor 105 may be smaller and may therefore have a smaller capacitance and a smaller maximum charge. But due to the fact that less energy is wasted during the charge transfer, the maximum field pause may still be the same than in concepts in which no step down converter circuit is used.

Embodiments of the present invention therefore provide a more efficient implementation of a transponder power supply comprising a smaller size, as a result of the reduced size of the capacitor, and/or enabling the possibility of a longer field pause.

According to further embodiments, the charging circuit 204 shown in FIG. 2 may be replaced with the charging circuit 104 shown in FIG. 1, which is configured to charge the emergency capacitor 105 based on the antenna input signal 102 to a maximum voltage which is higher than the voltage of the antenna input signal 102.

According to further embodiments, the output stage 106 shown in FIG. 1 may be replaced with the output stage 206 shown in FIG. 2, comprising the step down converter circuit 207.

Figure 3:
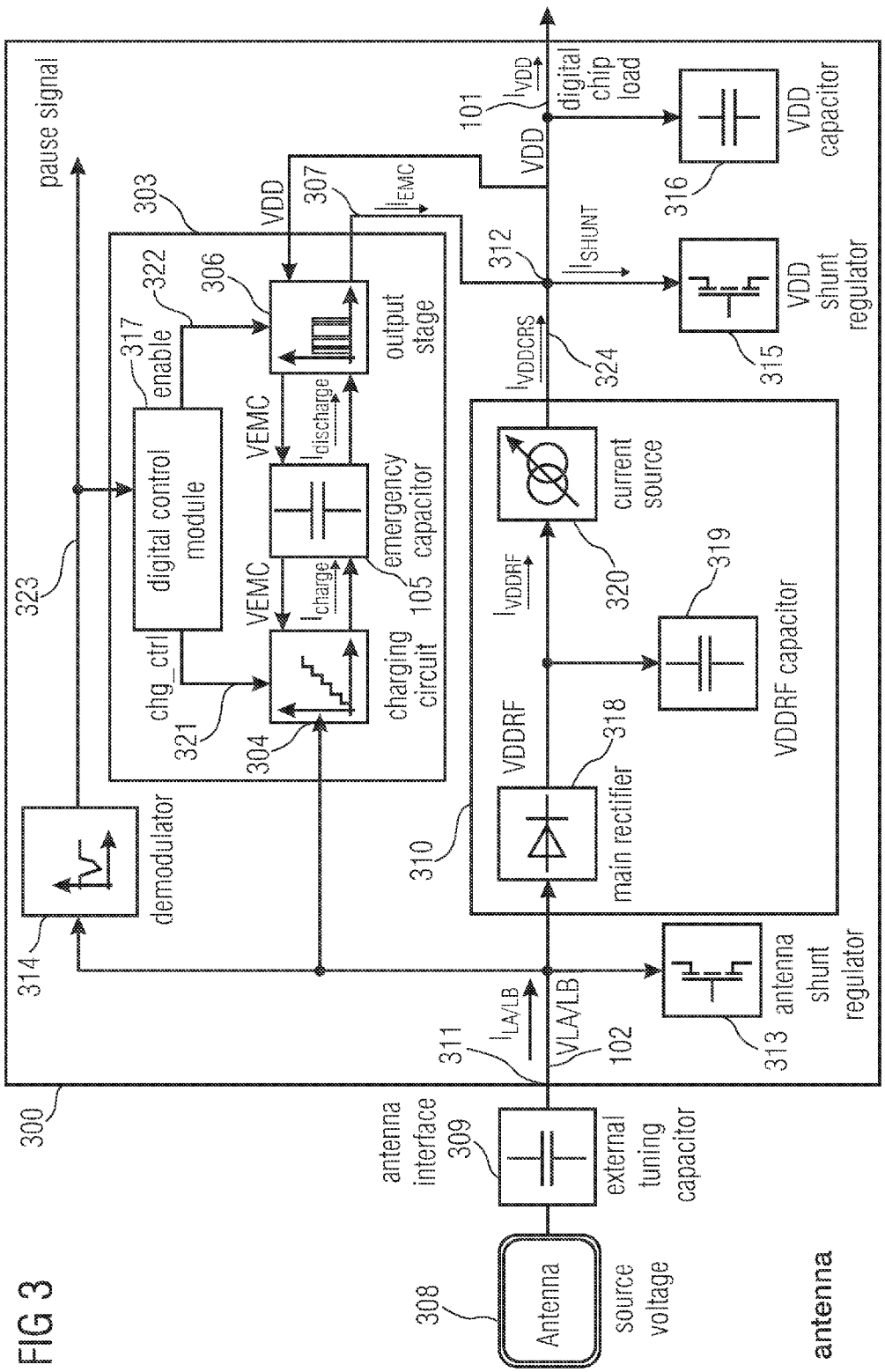
FIG. 3 shows a block diagram of a transponder power supply according to a further embodiment of the present invention.

FIG. 3 shows a block diagram of a transponder power supply 300 according to a further embodiment of the present invention with a connected antenna 308 and external tuning capacitor 309. The transponder power supply 300 for providing a power supply current 101 (a current $I_{VDD}$) based on an antenna input signal 102 (comprising a voltage VLA/LB and a current $I_{LA/LB}$) comprises an emergency circuit 303 and a regular power supply circuit 310. The emergency circuit 303 and the regular power supply circuit 310 are coupled in parallel in between an antenna interface terminal 311 of the transponder power supply 300 and a common VDD node 312 of the transponder power supply 300. The antenna 308 and the external tuning capacitor 309 are coupled to the antenna interface terminal 311. Furthermore, the transponder power supply 300 comprises an antenna shunt regulator 313 and a demodulator 314 coupled to the antenna interface terminal 311.

The transponder power supply 300 comprises a VDD shunt regulator 315 and a VDD capacitor 316 coupled to the common VDD node 312.

The emergency circuit 303 comprises a charging circuit 304, an emergency capacitor 105, an output stage 306, and a digital control module 317. The charging circuit 304 is configured to charge the emergency capacitor 105 based on the antenna input signal 102. The charging circuit 304 may, for example, be equal to the charging circuit 104 of the transponder supply 100, which means that the charging circuit 304 may be configured to charge the emergency capacitor 105 based on the antenna input signal 102 to a maximum voltage, which is higher than the voltage of the antenna input signal 102. The output stage 306 is configured to provide a contribution 307 (a current $I_{EMC}$) to the supply current 101 using a charge of the emergency capacitor 105. The output stage 306 may, for example, be equal to the output stage 206 of the transponder power supply 200 from FIG. 2, i.e., the output stage 206 may comprise a step down converter circuit 207 configured to provide the contribution 307 to the supply current 101. The emergency circuit 303 may, therefore, be a combination of the emergency circuit 103 and the emergency circuit 203, or may be equal to one of the emergency circuits 103 or 203.

The regular power supply circuit 310 comprises a main rectifier 318, a VDD RF capacitor 319, and a current source 320.

In the following, it is assumed that the emergency circuit 303 is a combination of the emergency circuit 103 from FIG. 1 and the emergency circuit 203 from FIG. 2. I.e. the charging circuit 304 is configured to charge the emergency capacitor 105, based on the antenna input signal 102, to a maximum voltage which is higher than a voltage of the antenna input signal 102, and the output stage 306 comprises a step down converter circuit 207 (not shown in FIG. 3) configured to provide the contribution 307 to the supply current 101, using the charge of the emergency capacitor 105. Using the combination of the emergency circuit 103 and the emergency circuit 203 leads to the emergency circuit 303 of the transponder supply 300 comprising a maximum efficiency. Nevertheless, there may be cases which arise wherein it is advantageous to only employ the emergency circuit 103 or the emergency circuit 203.

In the following, the working principle of the transponder power supply 300 will be explained in detail.

During normal operation, this means a magnetic field is present at the antenna 308 and the voltage (VLA/LB) of the antenna input signal 102 is above zero, the current source 320, providing a supply voltage VDD at the common VDD node 312, is supplied via the main rectifier 318. In a typical embodiment, the maximum voltage of the antenna input signal 102 is 5 V and controlled (or limited) by the antenna shunt regulator 313. The emergency capacitor 105 is charged up by the charging circuit 304 to the nominal voltage of a medium voltage capacitor independently from the present antenna voltage. In other words, the emergency capacitor 105 is charged up to a voltage higher than the voltage of the antenna input signal 102, which is also an input voltage of the charging circuit 304. As can be seen from FIG. 3, the charging circuit 304 provides a charge current $I_{charge}$ to the emergency capacitor 105. Due to this property of charging the emergency capacitor 105 to a higher voltage than the voltage of the antenna input signal 102, the charging circuit 304 may also be called a charge pump circuit. The charging circuit 304 may be controlled by the digital control module 317 in a manner in which the distortion of the antenna input signal 102 and its voltage (especially during data transmission) is at a minimum, using a charge control signal 321.

As in this phase (i.e., the magnetic field is present at the antenna 308 and the voltage (VLA/LB) of the antenna input signal 102 is above zero) the supply voltage VDD and the supply current 101 are fully supplied by the current source 320, the output stage 306 of the emergency circuit 303 may be turned off by the digital control module 317 using a discharge enable signal 322. The output stage 306 is therefore not consuming any current (or only an insignificant amount of current, e.g. leakage current) in the phase, in which the supply voltage VDD is directly supplied on the basis of the magnetic field coupled into the antenna 308.

When the antenna voltage VLA/LB (the voltage of the antenna input signal 102) becomes very low (for example, during a type A field gap), the main rectifier 318 cannot deliver any current to the current source 320, and as still some supply current 101 is consumed by a circuit coupled to the VDD node 312, the supply current 101 or at least a substantial portion of the supply current 101 needs to be supplied by the emergency circuit 303 sourcing the contribution 307 (the current $I_{EMC}$) to the VDD node 312. In other words, during a type A gap, the antenna voltage VLA/LB becomes very low and the main rectifier 318 turns off (for example for several microseconds). The field pause or the type A gap is detected by the demodulator 314 and this information is provided to the digital control module 317 by a pause signal 323. The load current (the supply current 101 or the current $I_{VDD}$) still consumed at the VDD node 312 is compensated by the emergency circuit current $I_{EMC}$ (by the contribution 307 to the supply current 101). In other words, during a type A gap or field pause, the charging circuit 304 is turned off and the output stage 306 (comprising the step down converter circuit 207) is activated by the digital control module 317, sourcing the current $I_{EMC}$ to the VDD node 312, which is equivalent or insignificantly differently from the VDD load current $I_{VDD}$ (the supply current 101). Due to this fact, no (or only an insignificantly low amount of) current is wasted in the VDD shunt regulator 315.

The end of the type A gap or field pause is again detected by the demodulator 314 and in response to this the output stage 306 is turned off and the charging circuit 304 is turned on to recharge the emergency capacitor 105.

According to some embodiments of the present invention, the digital control module 317 may be configured to provide a charge pump adjust signal to the charging circuit 304. The charging circuit 304 may therefore be configured to vary an amount of charge transferred within a given time unit from the antenna input signal 102 to the emergency capacitor 105. After detection of an end of the type A gap or the field pause, the charging circuit 304 may therefore be softly turned on, such that the antenna input signal 102 is disturbed as little as possible. The charge pump adjust signal may, for example, be part of the charge control signal 321.

To summarize, the transponder power supply 300 comprises the emergency circuit 303 and the regular power circuit 310, coupled in parallel to the emergency circuit 303. The regular power circuit 310 is configured to provide another contribution 324 (the current $I_{VDDCRS}$) to the supply current 101 at the common VDD node 312 if the voltage of the antenna input signal is above a given input threshold voltage. The emergency circuit 303 is configured to selectively provide its contribution 307 to the supply current 101 at the common VDD node 312 if the voltage of the antenna input signal 102 is equal to, or below, the given input threshold voltage.

It should be mentioned that during a type A gap or a field pause, the voltage of the antenna input signal 102 is equal to or below the mentioned given input threshold voltage.

It should also be mentioned that at the moment when the voltage of the antenna input signal 102 falls below the given input threshold voltage and the output stage 306 becomes enabled to deliver its contribution 307 to the supply current 101, the regular power circuit 310 may still deliver a small amount of current and therefore may still deliver its contribution 324 to the supply current 101. The small amount of current may, for example, be a discharge current of the VDDRF capacitor 319. After discharging the VDDRF capacitor 319, the current $I_{VDDRF}$ may become zero and the contribution 324 of the regular power circuit 310 may also become zero. For a maximum efficiency of the transponder power supply 300, the output stage 306 may adapt its contribution 307 (the current $I_{EMC}$) such that it is equivalent to the supply current 101 consumed at the VDD node 312, such that no current is wasted in the VDD shunt regulator 315, or in other words, a current $I_{SHUNT}$ floating out of the VDD node 312 into the VDD shunt regulator 315 may become zero.

Some advantages of the transponder power supply 300 shall be mentioned in the following. Due to the fact of using the charging circuit 304, which is configured to charge the emergency capacitor 105 to a maximum voltage which is above the voltage of the antenna input signal 102, the maximum voltage at the emergency capacitor 105 is, at least within a given range of the voltage of the antenna input signal 102, independent from the voltage of the antenna input signal 102. Therefore the full voltage range of the emergency capacitor 105 may be used, allowing a significant area reduction, as the capacitance and the size (the area it consumes) of the emergency capacitor can be reduced by at least a factor of 1.5 or 1.7, or 2. Additionally, the use of the step down convertor circuit 107 within the output stage 306 reduces or even dramatically reduces the energy loss caused by the charge transfer from the emergency capacitor 105 to the VDD node 312, again allowing an area reduction of the emergency capacitor 105, as less charge is wasted during the discharge cycle.

Figure 4A:
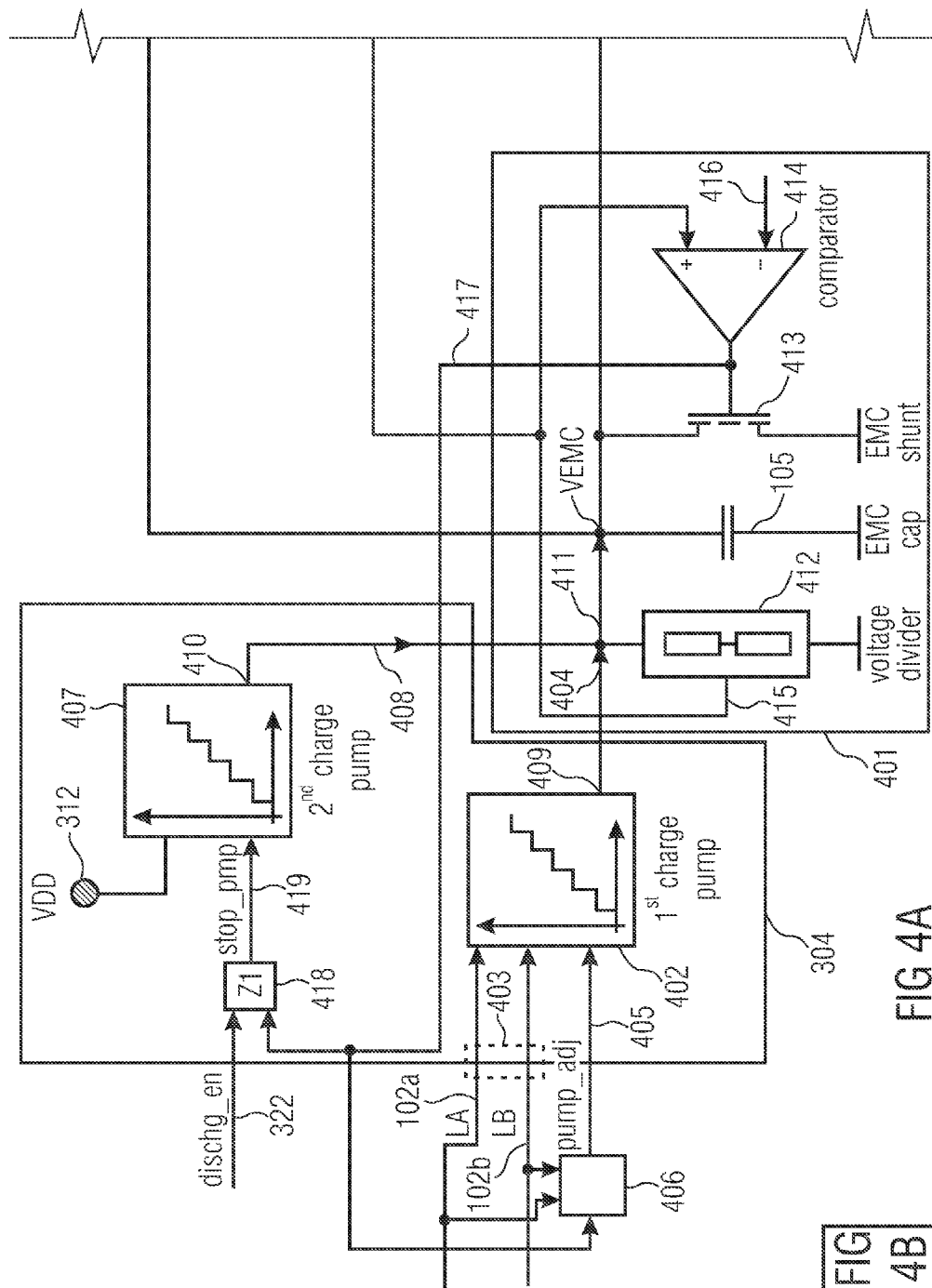
FIG. 4 shows a block diagram of an emergency circuit, which may be employed in the transponder power supplies according to FIG. 1 to FIG. 3.
Figure 4B:
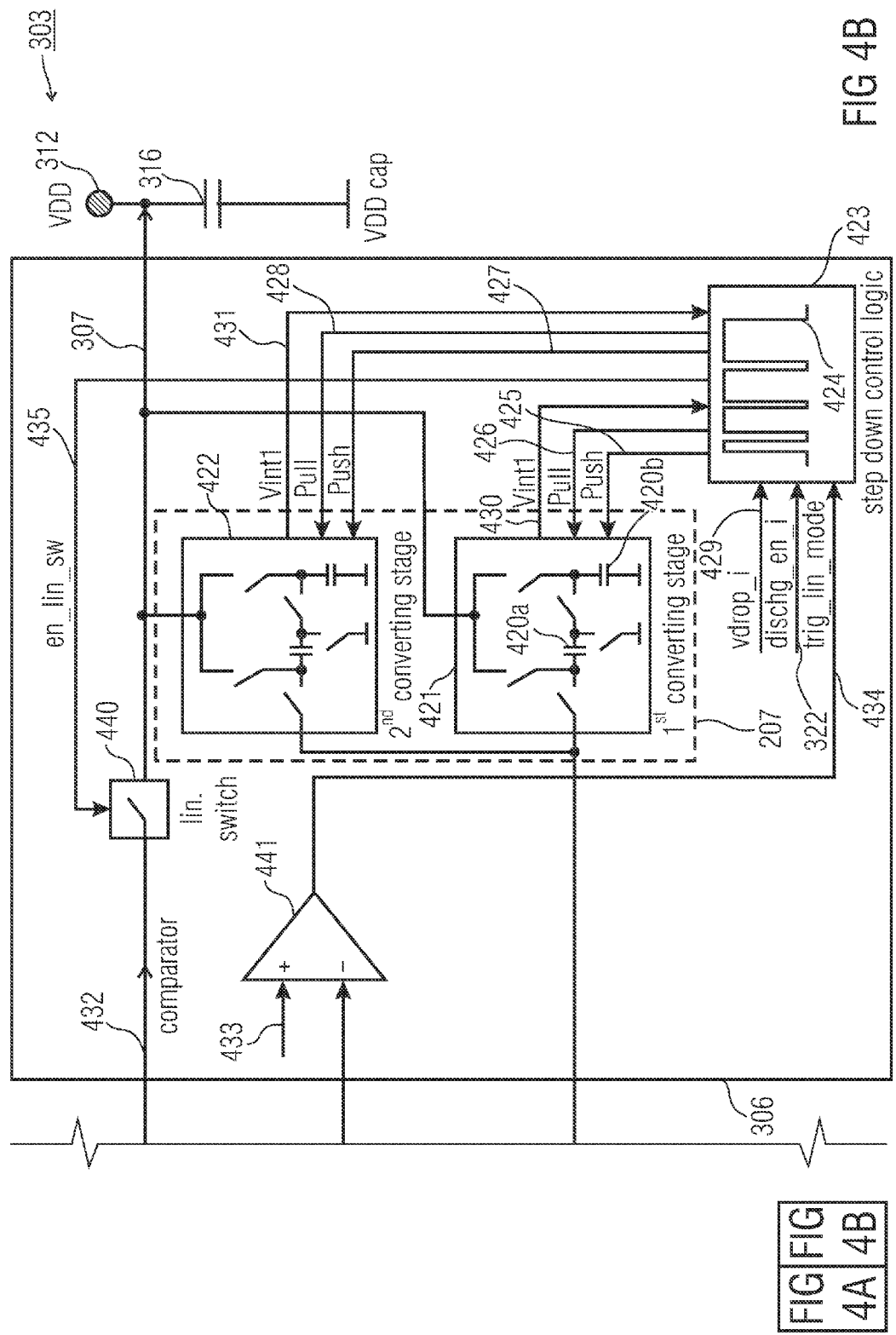

FIG. 4 shows, in an example, the emergency circuit 303 from FIG. 3 in a more detailed version. The emergency circuit 303 comprises the charging circuit 304, the output stage 306, and an emergency capacitor module 401. The emergency capacitor 105 of the emergency circuit 303 is comprised in the emergency capacitor module 401. The charging circuit 304 comprises a first charge pump 402 coupled to an antenna port 403 for the antenna input signal 102. As can be seen from FIG. 4, the antenna input signal 102 may be a fully differential signal, this means the antenna input signal 102 may comprise a first differential input signal 102a (LA) and a second differential input signal 102b (LB). The antenna port 403 may be directly connected to the antenna interface terminal 311 of the transponder power supply 300. The first charge pump 402 is configured to provide a first charge current 404 to the emergency capacitor 105, based on the antenna input signal 102. In other words, the first charge pump 402 is configured to transfer charge from the antenna input signal 102 to the emergency capacitor 105. The first charge pump 402 may also be called LA/LB charge pump 402.

As mentioned before, the charging circuit 304 may be configured to vary the amount of charge transferred from the antenna input signal 102 to the emergency capacitor 105. In the embodiment shown, the first charge pump 402 may perform this function, meaning that the first charge pump 402 may be configured to vary an amount of charge transferred from the antenna input signal 102 to the emergency capacitor 105 in dependence on a charge pump adjust signal 405 (which may be part of the charge control signal 321). The transponder power supply 300 may therefore comprise a charge pump adjuster 406 (for example, comprised in the digital control module 317) configured to provide the charge pump adjust signal 405 in dependence on a voltage of the antenna input signal 102. The charge pump adjuster 406 may provide the charge pump adjust signal 405, such that a first amount of charge transferred within a given time unit in a first state in which an amplitude of the voltage of the antenna input signal 102 is comparatively small, is smaller than a second amount of charge transferred within the given time unit in a second state, in which the amplitude of the voltage of the antenna input signal 102 is comparatively larger. In other words, the charge pump adjuster 406 may be configured to adjust the first charge pump 402 such that the strength of the first charge pump 402, and in the end the current sunk from the antenna port 403 during the charge cycle, is adjusted by the charge pump adjust signal 405 in a manner that the distortion of the antenna voltage and of the antenna input signal 102 is minimized under all operating conditions. This is advantageous because the first charge pump 402 is supplied by the first differential antenna signal 102a and the second differential antenna input signal 102b, i.e. by the antenna input signal 102.

In addition to the first charge pump 402, the charging circuit 304 may comprise a second charge pump 407 configured to provide a second charge current 408 to the emergency capacitor 105 based on a supply voltage VDD at the common VDD node 312, or in other words, by transferring charge from the common VDD node 312. In other words, the second charge pump 407 is supplied from the VDD node 312 (based on the supply voltage VDD) and the first charge pump 402 is supplied from the antenna port 403 (based on the antenna voltage). An output 409 of the first charge pump 402 providing the first charge current 404 and an output 410 of the second charge pump 407 providing the second charge current 408 are coupled to the emergency capacitor 105, such that an overall charge current 411 of the emergency capacitor 105 is a sum of the first charge current 404 and the second charge current 408.

The first charge pump 402 and the second charge pump 407 may be configured such that a maximum charge current provided by the first charge pump 402 is larger, at least by a factor of 2, or of 5, or of 10, or of 20, or even of 50, than a maximum charge current provided by the second charge pump 407. According to further embodiments other values for the factor are also possible. The first charge pump 402 may therefore be implemented for quickly recharging the emergency capacitor 105 from a low voltage level (for example, after a type A gap or a field pause). The second charge pump 407 may be implemented to compensate current consumption and leakage current in the emergency capacitor module 401. According to some embodiments the second charge pump 407 may only be used for compensating leakage at the emergency capacitor 105.

As mentioned before, the digital control module 317 (not shown in FIG. 4), may activate the recharging circuit 304 if the voltage of the antenna input signal 102 is above a given threshold input voltage and may furthermore deactivate the output stage 306, if the voltage of the antenna input signal 102 is above the given threshold input voltage. The digital control module 317 may therefore comprise a power control circuit configured to activate and deactivate the charging circuit 304, in dependence on the voltage of the antenna input signal 102. The first charge pump 402 and/or the second charge pump 407 may, therefore, be configured to selectively provide the first charge current 404 and/or the second charge current 408, only if the voltage of the antenna input signal 102 is above the given threshold input voltage.

As mentioned before, the second charge pump 407 may be implemented to compensate current consumption and leakage current in the emergency capacitor module 401. The power control circuit may therefore further be configured to activate and deactivate the second charge pump in dependence of the voltage at the emergency capacitor 105. The second charge pump 407 may therefore be configured to provide the second charge current 408 until the emergency capacitor 105 reaches its maximum voltage, to interrupt providing the second charge current 408 until the voltage at the emergency capacitor 105 falls below a given leakage current emergency capacitor threshold voltage and to resume providing the second charge current 408.

The power control circuit may therefore be configured to activate both, the first charge pump 402 and the second charge pump 407, after an increase of the antenna input signal from a voltage below the given input threshold voltage to a voltage above the given threshold voltage in order to charge the emergency capacitor 105 to the maximum voltage, to subsequently deactivate both, the first charge pump 402 and the second charge pump 407, and to keep the voltage at the emergency capacitor 105 within a predetermined range using the second charge pump 407 (or using the second charge pump 407 only), while the voltage of the antenna input signal 102 is above the given input threshold voltage. The predetermined range may, for example, be a range from the maximum voltage of the emergency capacitor 105 down to 90% of the maximum voltage, down to 80% of the maximum voltage, down to 75% of the maximum voltage, or even down to 50% of the maximum voltage of the emergency capacitor 105.

According to further embodiments, the control circuit may be configured to activate only the first charge pump 402 after (or in response to) the increase of the antenna input signal voltage from below the given input threshold voltage to a voltage above the given input threshold voltage until the maximum voltage of the emergency capacitor 105 has been reached, and to use the second charge pump 407 only to keep the voltage at the emergency capacitor 105 within the predetermined range.

In other words, the charging circuit 304 implements a small (VDD supplied) second charge pump 407 and a large (VLA/LB supplied) first charge pump 402. The first charge pump 402 is turned on after the discharge phase for quickly recharging the emergency capacitor 105 from a low voltage level. For a faster recharging the second charge pump 407 may also be turned on, e.g. after the supply voltage VDD has been stabilized. The strength of the first charge pump 407 and in the end the current sunk from the antenna port 402 during the charge cycle may be adjusted by the charge pump adjust signal 405 in a manner that the distortion of the antenna voltage is minimized under all operating conditions. In addition to the first charge pump 402, the second charge pump 407 is active as long as the voltage at the emergency capacitor 105 does not reach its target value (the maximum voltage). The second charge pump 407 may be implemented to compensate current consumption and leakage current in the emergency capacitor module 401.

As can be seen from FIG. 4 may the emergency capacitor module 401 comprise a voltage divider 412, used to sense the voltage of the emergency capacitor 105, an emergency capacitor shunt (EMC shunt) 413 used to clamp the voltage at the emergency capacitor 105 and a first comparator 414 (which may also be part of the abovementioned power control circuit). The first comparator 414 may control the EMC shunt 413 and the small second charge pump 407, which is may be turned on and off whether the voltage limit at the emergency capacitor 105 is reached or not.

The first comparator 414 compares an output voltage 415 of the voltage divider 412, which is proportional to the voltage at the emergency capacitor 105, with a first reference voltage 416 and provides a maximum-voltage-reached signal 417 on the basis of which the power control circuit may activate and deactivate the second charge pump 407. The maximum-voltage-reached signal 417 may also be used to activate the EMC shunt 413 to clamp the voltage of the emergency capacitor 105 and therefore to prevent the emergency capacitor 105 from overcharging. The maximum-voltage-reached signal 417 may be fed into an OR-block 418 together with the enable signal 322 to provide a stop-second-charge-pump signal 419 to the second charge pump 407. In other words, the power control circuit may be configured to deactivate the second charge pump 407, if the voltage of the antenna input signal 102 is equal to or below the given input threshold voltage and/or if the voltage at the emergency capacitor 105 is in the predetermined range around (or below) the maximum voltage of the emergency capacitor 105.

In the first comparator 414, a hysteresis function may be implemented which means that the maximum-voltage-reached signal 417 is not immediately reset after the voltage at the emergency capacitor 105 falls below the maximum voltage, but (only) after the voltage at the emergency capacitor 105 falls below the predetermined range.

In other words, the maximum-voltage-reached signal 417 signals that the emergency capacitor 105 has reached its maximum value or its target value, and the second charge pump 407 is therefore deactivated. The voltage at the emergency capacitor 105 may drop within a certain range without resetting the maximum-voltage-reached signal 417. This prevents uninterrupted on/off switching of the second charge pump 407.

The charge pump adjuster 406 may further be configured to provide the charge pump adjust signal 405 based on the maximum-voltage-reached signal 417 provided by the first comparator 414. In other words, the charge pump adjuster 406 may be configured to deactivate the first charge pump 402 if the emergency capacitor 105 is fully charged.

Additionally, as mentioned before, the digital control module 317 (or the mentioned power control circuit) may further be configured to activate the output stage 306 (for example, based on the enable signal 322) and deactivate the first charge pump 402 and the second charge pump 407, if the voltage of the antenna input signal 102, reaches or falls below, the given input threshold voltage, and to deactivate the output stage 306 (for example, using the enable signal 322) if the voltage of the antenna input signal 102 is above the given input threshold voltage.

After explaining the details of the charging circuit (or charge pump circuit) 304 and the emergency circuit 401, the output stage 306 will be explained in more detail in the following. As mentioned before, the charging circuit 304 is typically active as long as a magnetic field is present at the antenna 308, and therefore, as long as the voltage of the antenna input signal 102 is above the given input threshold voltage. The output stage 306 is, in contrast to this, typically active during a field pause or a type A gap, and therefore if the voltage of the antenna input signal 102 is equal to or below the given input threshold voltage.

The step down converter circuit 207 of the output stage 306 may be a switched capacitor step down converter circuit configured to provide a step down output voltage (for example, the voltage VDD) at the common VDD node 312, based on a switching between a serial connection of at least two step down capacitors 420a, 420b and a parallel connection of the at least two step down capacitors 420a, 420b. The use of a switched capacitor step down circuit is an advantage because this may be implemented using integrated circuit technologies without the need for inductive components.

The step down converter circuit 207 comprises a first converting stage 421 and a second converting stage 422. As can be seen from FIG. 4, the first converting stage 421 and the second converting stage 422 may be switched capacitor converting stages. The first converting stage 421 and the second converting stage 422 are coupled in parallel in between the emergency capacitor 105 and the VDD node 312.

The output stage 306 further comprises a step down control logic 423 (which, for example, may be comprised in an output control circuit). The step down control logic 423 is configured to generate a non-overlapping clock signal 424 controlling the first converting stage 421 and the second converting stage 422, such that in a first phase the contribution 307 to the supply current 101 of the output stage 306 is provided at the common VDD node 312 by the first converting stage 421, and such that in a second state, the contribution 307 is provided at the common VDD node 312 by the second converting stage 422. More precisely, the step down control logic 423 generates a first push signal 425 and a first pull signal 426 for controlling the first converting stage 421. Furthermore, the step down control logic 423 generates a second push signal 427 and a second pull signal 428 for controlling the second converting stage 422. The push signals and the pull signals control switches of the converting stages 421, 422. The first push signal 425 may be an inverse version of the second push signal 427 and the first pull signal 426 may be an inverse version of the second pull signal 428. In the above-mentioned first state, capacitors of the first converting stage 421 may be coupled in parallel to the VDD node 312 and capacitors of the second converting stage 422 may be coupled in series with the emergency capacitor 105. Therefore, in the first state, charge is transferred from the capacitors of the first converting stage 421 to the VDD node 312 and from the emergency capacitor 105 to the capacitors of the second converting stage 422. In the second state this happens vice-versa. By implementing the two converting stages 421, 422, it can be ensured that the output stage 406 can always (or almost uninterruptedly) deliver its contribution 307 to the supply current 101. This is ensured by the alternating switching of the first converting stage 421 and the second converting stage 422 between the emergency capacitor 105 and the common VDD node 312.

As can be seen from FIG. 4, the first converting 421 stage may be a first switched capacitor step down converter and the second converting stage 422 may be a second switched capacitor step down converter. The two converting stages 421, 422 may be equal, this means that they may comprise the same number and sizes of capacitors and switches.

Furthermore, the step down control logic 423 may be configured to compare a compare signal 429 derived from the supply voltage VDD at the common VDD node 312, with a first internal voltage 430 of the first converting stage 421 and a second internal voltage 431 of the second converting stage 422, to control a frequency and/or a duty cycle of the non-overlapping clock signal 424 (and therefore frequencies and duty cycles of the push signals 425, 427 and the pull signals 426, 428) based on the comparisons of the internal voltages 430, 431 with the compare signal 429 derived from the supply voltage VDD, such that the supply voltage VDD at the common VDD node 312 is in a predetermined range.

The predetermined range for the supply voltage VDD may, for example, be 1 to 2 V, 1.2 to 1.8 V, 1.3 to 1.5 V, or 1.4+/−5%.

The compare signal 429 may be a current or a voltage derived from the supply voltage VDD and may be proportional to the supply voltage VDD to represent the supply voltage VDD.

In other words, the step down control logic 423 is be configured to sense the internal voltages 430, 431 in the converting stages 421, 422 (in the step down converters) and the supply voltage VDD at the common VDD node 312 via the compare signal 429 to generate the non-overlapping clock signal 424 for the two converting stages 421, 422. The compare signal 429 may be generated by a comparator outside the emergency circuit 303.

The frequency and duty cycle of the non-overlapping clock signal 424 controlling the two converting stages 421, 422 may be generated by an oscillator integrated in the step down control logic 423 and are adapted to the present VDD voltage level.

As can be seen in FIG. 4, the output stage 306 may further comprise a switch 440 and a second comparator 441. The switch 440 and the step down converter circuit 207 (comprising the parallel connection of the first converting stage 421 and the second converting stage 422) are coupled in parallel between the emergency capacitor 105 and the common VDD node 312. The step down control logic 423 of the output stage 306 is configured to open the switch 440 and activate the step down converter circuit 207 (using the non-overlapping clock signal 424) if the voltage at the emergency capacitor 105 is above a given switched mode emergency capacitor threshold voltage, such that the contribution 307 to the supply current 101 provided at the VDD node 312 is based on a current provided by the step down converter circuit 207 (e.g. on a current from the first converting stage 421 or the second converting stage 422). The step down control logic 423 is further configured to close the switch 440 and deactivate the step down converter circuit 207 (using the non-overlapping clock signal 424) if the voltage at the emergency capacitor 105 is equal to or below the given switched mode emergency capacitor threshold voltage, such that the contribution 307 to the supply current 101 provided at the VDD node 312 is a discharge current 432 of the emergency capacitor 105 routed along the closed switch 440.

For providing this function within the step down control logic 423, the second comparator 441 may compare the voltage 415 which is proportional to the voltage at the emergency capacitor 105 with a second reference voltage 433. The second reference voltage 433 may be lower than the first reference voltage 416. Based on the comparison of the second reference voltage 433 with the voltage 415 which is proportional to the voltage at the emergency capacitor 105, the second comparator 441 may generate a trigger-linear-mode signal 434, which is fed into the step down control logic 423. The step down control logic 423 may sense the trigger-linear-mode signal 434 and generate an enable-linear-switch signal 435 and may also adjust the push signals 425, 427 and/or the pull signals 426, 428 to the first converting stage 421 and the second converting stage 422, such that the first converting stage 421 and the second converting stage 422 are, optionally, disconnected from the emergency capacitor 105, if the switch 440 is closed.

The switch 440 may, for example, be a transistor, wherein the enable-linear-switch signal 435 may be coupled to a gate terminal of the transistor or may, for example, be a switchable-linear-controller.

The output stage 306 can therefore work in two different modes: switched capacitor mode (if the first converting stage 421 and the second converting stage 422 are active or, in general, the step down converter circuit 207 s active and the switch 440 is opened) or linear mode (if the (linear) switch 440 is closed and the step down converter circuit 207 is deactivated. Switched capacitor mode is activated as long as the voltage at the emergency capacitor 105 is above the given second capacitor threshold voltage where the two converting stages 421, 422 can deliver sufficient current, or, in other words, a sufficiently high contribution 307 to the VDD node 312. If the voltage at the emergency capacitor 105 is below the given switched-mode emergency capacitor threshold voltage, the output stage 306 switches to linear mode in order to deliver the current consumed at the VDD node 312. The decision whether switched capacitor mode or linear mode is activated is taken in the step down control logic 423 of the output stage 306, based on the trigger-linear-mode signal 434, generated by the second comparator 441. As mentioned before, the step down control logic 423 senses the internal voltages 430, 431 in the first converting stage 421 and the second converting stage 422, and the voltage at the VDD node 312 via the compare signal 429 derived from the supply voltage at the VDD node 312 and generates the non-overlapping clock signal 424 for the two converting stages 421, 422. And furthermore, does the step down control logic 423 generate the control signal 435 (the enable linear switch signal 435) for the linear switch 440. The frequency and duty cycle of the non-overlapping clock signal 424 controlling the converting stages 421, 422 are adapted to the present VDD voltage level and in the end adapted to the load current consumed from the VDD node 312.

In short, the high efficiency emergency circuit concept shown in FIG. 4 results from the combination of an adaptive, multiple stage charging circuit 304 (comprising the first charge pump 402 and the second charge pump 407), the emergency capacitor 105 and the two stages, self oscillating capacitive step down converting circuit 207 (comprising the first step down voltage converter 421, and the second step down voltage converter 422). The first charge pump 422 and the second charge pump 407 are turned on after discharge phase for recharging the emergency capacitor 105 from a low voltage level. The second charge pump 407 is used to compensate current consumption and leakage current in the emergency capacitor module 401. During the discharge phase (indicated by the discharge enable signal 322, derived from the pause signal 323 from the demodulator 314) the charging circuit 304 is stopped and the output stage 306 (comprising the step down converter circuit 207) is activated. The contribution 307 to the supply current 101 is provided by the step down converter circuit 207 until the voltage at the emergency capacitor 105 falls below the given switched mode emergency capacitor threshold voltage (as long as the step down converter circuit 207 can deliver enough current to the VDD node 312).

Some embodiments of the present invention provide, therefore, a high-efficiency emergency capacitor concept for transponder power supplies allowing the reduction of the area of an emergency capacitor by at least a factor of 2.

Figure 5:
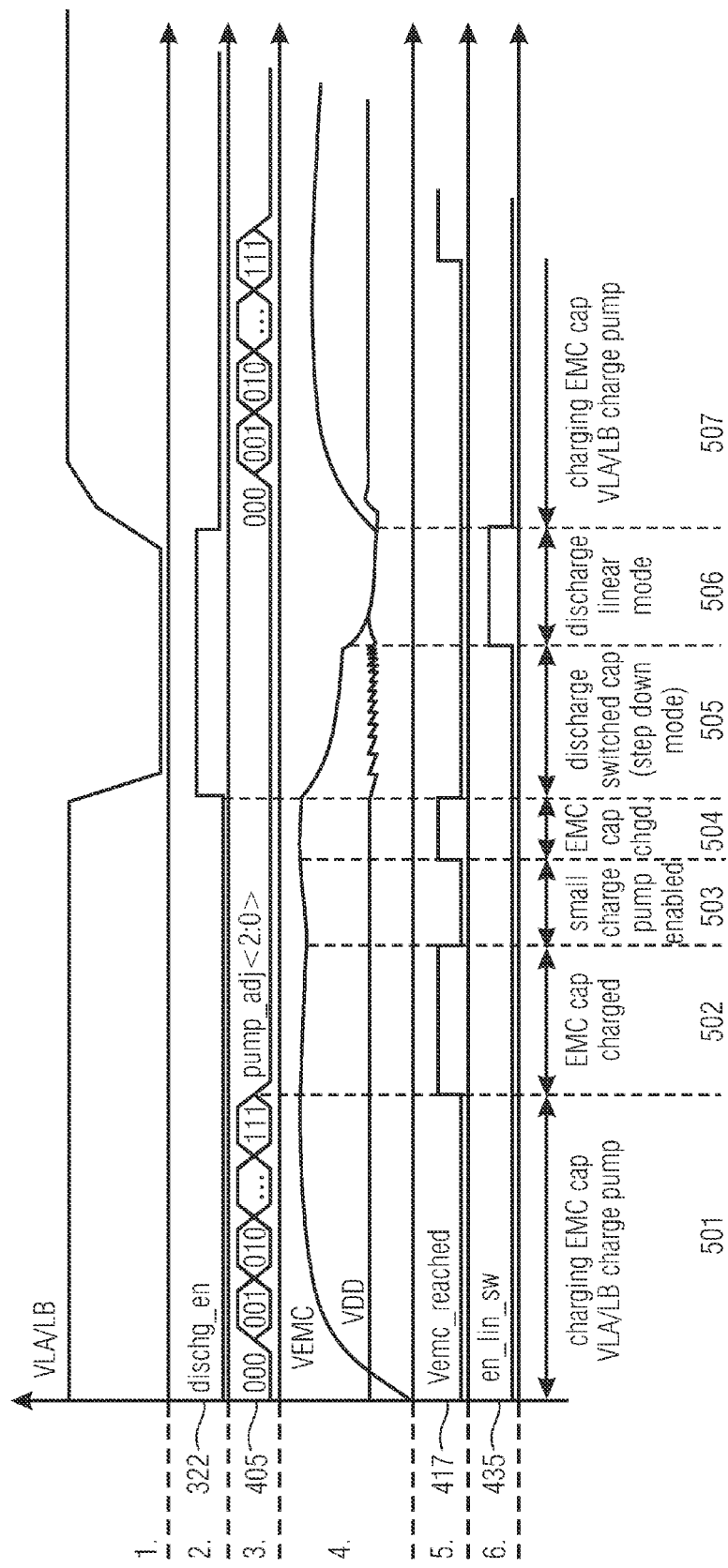
FIG. 5 shows an example of a timing diagram of a single charge/discharge-cycle using the emergency circuit according to FIG. 4.

FIG. 5 shows an example of a timing diagram of a single charge/discharge cycle as it may occur in the transponder power supply 300 from FIG. 3 with the emergency circuit 303 from FIG. 4. The diagram shows, in a first row, the voltage of the antenna input signal 102 as a function of time. In a second row of the diagram, the discharge enable signal 322 as a function of time is shown. In a third row of the diagram, the charge pump adjust signal 405 as a function of time is shown. The value <000> for the charge pump adjust signal 405 corresponds in this concrete embodiment with the lowest charge current delivered from the first charge pump 402 and the value <111> corresponds with the highest charge current delivered from the first charge pump 402. In a fourth row of the diagram, the supply voltage VDD at the common VDD node 312 as a function of time, and the voltage VEMC at the emergency capacitor 105 as a function of time are shown. In a fifth row of the diagram, the maximum-voltage-reached signal 417 as a function of time is shown. In a sixth row of the diagram, the enable-linear-switch signal 435 as a function of time is shown. In the diagram time is drawn at the x-axis and amplitudes (or logic states) of the different signals are drawn at the y-axis.

In a first time interval 501, the voltage VLA/LB of the antenna input signal 102 is above the given input threshold voltage. In other words, a magnetic field is present at the antenna 308. Therefore, the charging circuit 304 is activated and the output stage 306 is deactivated. The voltage VEMC at the emergency capacitor 105 is increased and the voltage VDD at the common VDD node 312 is sourced from the regular power circuit 310. From the third row of the diagram, it can be seen that the second charge pump 402 is started softly to not disturb the antenna input signal 102. The amount of charge transferred within one time unit from the antenna input signal 102 to the emergency capacitor 105 by the first charge pump 402 is increased with an increasing value of the charge pump adjust signal 405. Therefore, at the end of the first time interval 501, the most charge per time unit is transferred from the antenna input signal 102 to the emergency capacitor 105. The emergency capacitor 105 is charged to its maximum voltage. As mentioned before, the second charge pump 407 may also be switched on and transfer a small amount of charge (when compared to the amount of charge transferred by the first charge pump 402), from the VDD node 312 to the emergency capacitor 105. If the second charge pump 407 is switched on or off in this time interval 501 may be configurable and may be different for different embodiments of the present invention. Therefore at least in some embodiments it can be sufficient if only the first charge pump 402 is switched on during this time interval 501 to quickly charge the emergency capacitor 105.

At the end of the first time interval 501 the voltage at the emergency capacitor 105 reaches the maximum voltage (i.e. the emergency capacitor 105 is fully charged). Therefore in a subsequently following second time interval 502 of the diagram, the maximum-voltage-reached signal 417 switches from logical "0" to logical "1". Therefore, the first charge pump 402 and the second charge pump 407 are deactivated. As it can be seen from the diagram, a small amount of current is consumed by the emergency capacitor module 401 during the second time interval 502.

To compensate this in a subsequently following third time interval 503, the second charge pump 407 is activated, which transfers charge from the VDD node 312 to the emergency capacitor 105. This activation of the second charge pump 407 is triggered by the falling edge of the maximum voltage reached signal 417. The second charge pump 407 is until the emergency capacitor 105 is fully charged, which is signaled by the rising edge of the maximum-voltage-reached signal 417.

Therefore, in a subsequently following fourth time interval 504, the emergency capacitor 105 gets fully charged again.

In a subsequently following fifth time interval 505, a type A gap or field pause occurs, i.e. the voltage VLA/LB of the antenna input signal 102 drops to a voltage equal to or below the given input threshold voltage. The demodulator 414 senses this and sets the discharge enable signal 322. An active charge pump (the first charge pump 402 and/or the second charge pump 407) would be deactivated and the output stage 306 is activated in the switched capacitor mode. This means that the linear switch 440 is opened and the first converting stage 421 and the second converting stage 422 of the step down converter circuit 207 are activated (under the assumption that the voltage at the emergency capacitor 105 is sufficiently high) and provide the contribution 307 to the supply current 101. This can also be seen by the ripple at the supply voltage VDD. Due to the fact that the first converting stage 421 and the second converting stage 422 are sourced by the emergency capacitor 105, the voltage VEMC at the emergency capacitor 105 decreases, and the maximum-voltage-reached signal 417 is reset. At the end of the fifth time interval 505, the comparator 441 detects that the voltage VEMC falls below the given switched-mode emergency capacitor threshold voltage and signals this via the trigger-linear-mode signal 434 to the step down control logic 423, which then closes the linear switch 440 by setting the enable linear switch signal 435 and by deactivating the step down converter circuit 207.

In a subsequently following sixth time interval 506, the output stage 306 is therefore in the linear mode, wherein the contribution 307 to the supply current 101 provided at the VDD node 312 is equivalent to the discharge current 432 of the emergency capacitor 105 routed along the linear switch 440.

At the beginning of the subsequently following seventh time interval 507, the type A gap or field pause is over and the voltage VLA/LB of the antenna input signal 102 increases above the given input threshold voltage and the demodulator 314 detects the end of the type A gap or field pause and therefore the discharge enable signal 322 is reset by the digital control module 317, deactivating the output stage 306. Furthermore, the first charge pump 402 and the second charge pump 407 are activated again and the emergency capacitor 105 is recharged quickly to its maximum voltage.

In the embodiments described above, it has been assumed that the demodulator 314 sets the power signal 323 if the voltage of the antenna input signal 102 is equal to or below a given input threshold voltage and resets the power signal if the voltage of the antenna input signal 102 is above the given threshold input voltage. According to further embodiments, the demodulator 314 may comprise a hysteresis function, which means the demodulator 314 may be configured to set the pause signal 323 if the voltage of the antenna signal 102 is equal to or below a given first input threshold voltage and to reset the power signal 323 if the voltage of the antenna input signal 102 is above a given second threshold voltage. The given first input threshold voltage may be different from the given second input threshold voltage.

Figure 6:
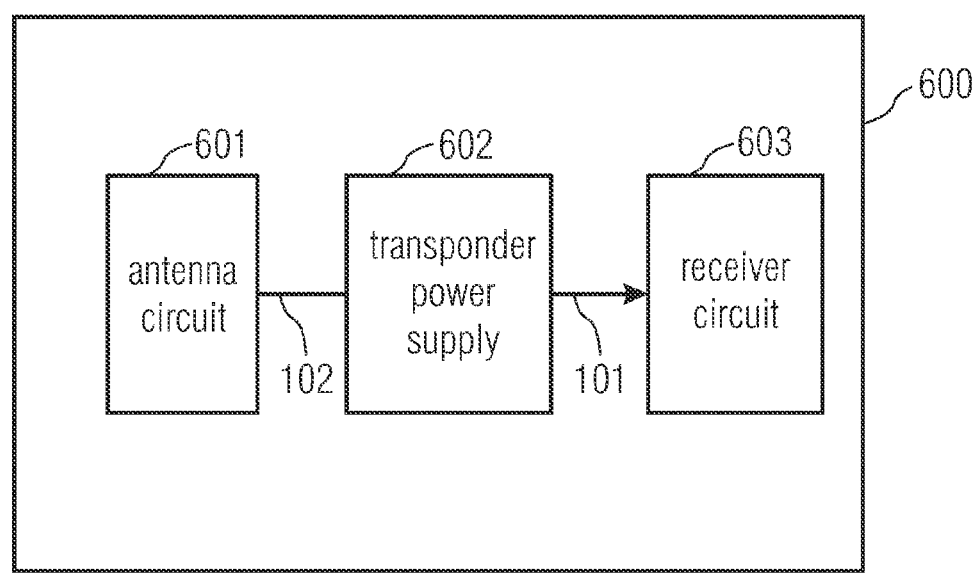
FIG. 6 shows a block diagram of a transponder according to a further embodiment of the present invention.

FIG. 6 shows a block diagram of a transponder 600 according to an embodiment of the present invention. The transponder 600 comprises an antenna circuit 601, a transponder power supply 602 and a receiver circuit 603. The antenna circuit 601 may, for example, be equal to the antenna 308 with the external tuning capacitor 309 shown in FIG. 3. The transponder power supply 602 may, for example, be equal to the transponder power supply 100 from FIG. 1, the transponder power supply 200 from FIG. 2, or the transponder power supply 300 from FIG. 3. The transponder power supply 602 is configured to provide a supply current 101 based on an antenna input signal 102. The transponder power supply 602 provides the supply current 101 to the receiver circuit 603. The receiver circuit 603, which is sourced from the transponder power supply 602, may, for example, be configured to demodulate an amplitude modulated signal, for example, according to the ISO 14443 A Standard. Instead of a receiver circuit 603, the trans-ponder 600 may also comprise a transceiver circuit which may also be configured to receive an amplitude modulated signal. The transceiver circuit may further be configured to transmit data using load modulation schemes.

Figure 7:
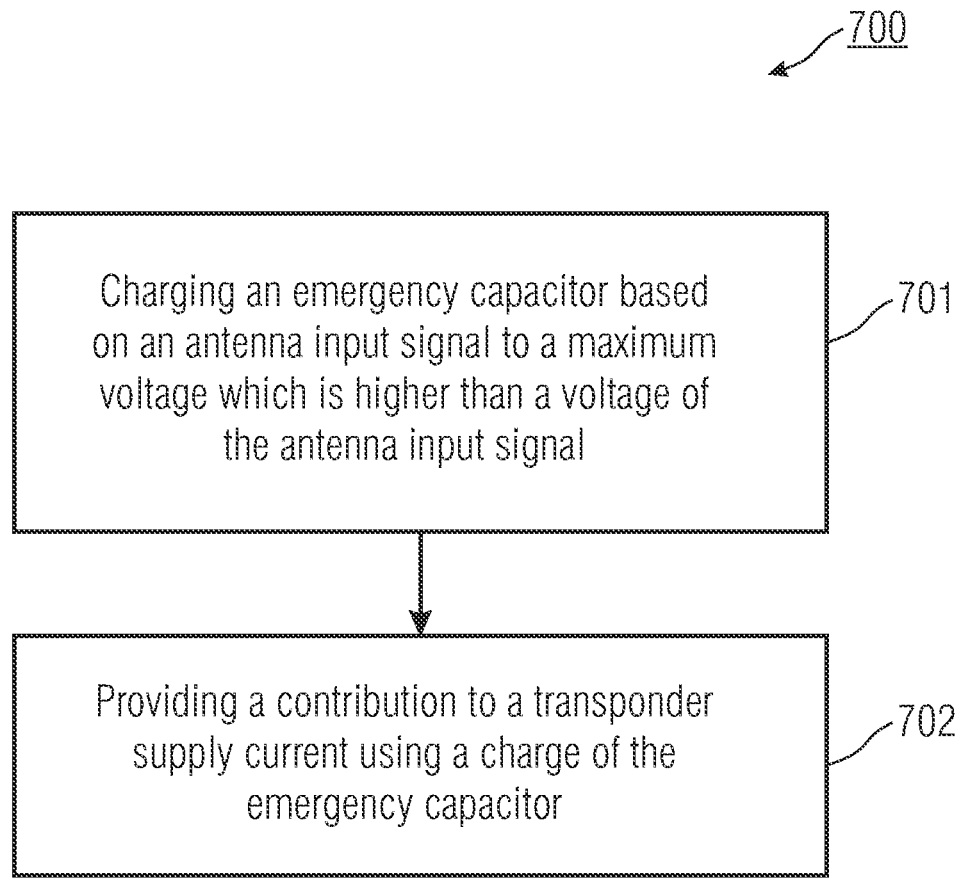
FIG. 7 shows a flow diagram of a method according to a further embodiment of the present invention.

FIG. 7 shows a flow diagram of a method 700 for providing a supply current based on an antenna input signal. The method 700 comprises a step 701 of charging an emergency capacitor based on the antenna input signal to a maximum voltage which is higher than a voltage of the antenna input signal. Furthermore, the method 700 comprises a step 702 of providing a contribution to the transponder supply current using a charge of the emergency capacitor. The step 701 may for example correspond to the time interval 501 of the diagram shown in FIG. 5, and the step 702 may for example correspond to the time intervals 505 and 506 of the diagram shown in FIG. 5. The method 700 may, for example, be performed using the transponder power supply 100 shown in FIG. 1.

Figure 8:
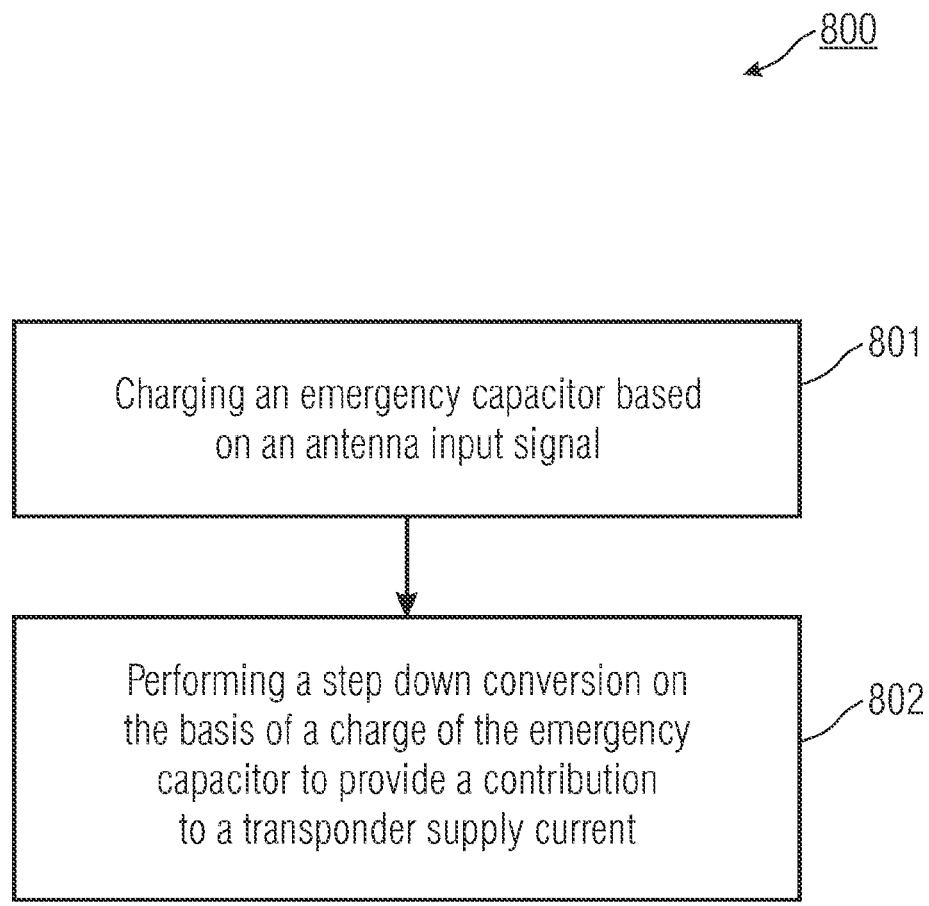
FIG. 8 shows a flow diagram of a method according to a further embodiment of the present invention.

FIG. 8 shows a flow diagram of a method 800 for providing a transponder supply current based on an antenna input signal. The method 800 comprises a step 801 of charging an emergency capacitor based on an antenna input signal. Furthermore, the method 800 comprises a step of performing a step down conversion on the basis of a charge of the emergency capacitor to provide a contribution to the transponder supply current. The step 801 may, for example, correspond to the time interval 501 of the diagram shown in FIG. 5 and the step 802 may, for example, correspond to the time interval 505 of the diagram shown in FIG. 5. The method 800 may, for example, be performed by the transponder power supply 200 according to FIG. 2.

The methods 700, 800 may be supplemented by any of the features and functionalities described herein with respect to the apparatus, and may be implemented using the hardware components of the apparatus.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Spatially relative terms such as "under", "below", "lower", "over", "upper" and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A transponder power supply for providing a supply current based on an antenna input signal, the transponder power supply comprising:
an emergency circuit comprising a charging circuit, an emergency capacitor, and an output stage;
wherein the charging circuit is configured to charge the emergency capacitor based on the antenna input signal;
wherein the output stage comprises a step down converter circuit configured to provide a contribution to the supply current using a charge of the emergency capacitor;
wherein the output stage comprises an output control circuit;
wherein the step down converter circuit comprises a first converting stage and a second converting stage coupled in parallel between the emergency capacitor and a common VDD node;
wherein the output control circuit is configured to generate a non-overlapping clock signal controlling the first converting stage and the second converting stage, such that in a first state the contribution to the supply current is provided at the common VDD node by the first converting stage, and such that in a second state the contribution to the supply current is provided at the common VDD node by the second converting stage; and
wherein the output control circuit is configured to compare a signal derived from a supply voltage at the common VDD node with an internal voltage of the first converting stage and an internal voltage of the second converting stage, and to control a frequency or a duty cycle of the non-overlapping clock signal based on the comparisons of the internal voltages with the signal derived from the supply voltage, such that a supply voltage VDD at the common VDD node is in a predetermined range.

2. The transponder power supply according to claim 1, wherein the step down converter circuit is a switched capacitor step down converter circuit configured to provide a step down output voltage at a common VDD node based on a switching between a serial connection of at least two step down capacitors and a parallel connection of the at least two step down capacitors.

3. The transponder power supply according to claim 1, further comprising a power control circuit configured to activate the charging circuit and deactivate the output stage if a voltage of the antenna input signal is above a given input threshold voltage and to deactivate the charging circuit and activate the output stage if the voltage of the antenna input signal is equal to, or below, the given input threshold voltage.

4. A transponder including the transponder power supply according to claim 1, the transponder further including an antenna and a receiver circuit configured to receive an amplitude modulated datastream within the antenna input signal, the transponder power supply being configured to provide the supply current to the receiver circuit based on the antenna input signal from the antenna.

5. The transponder according to claim 4,
wherein the receiver circuit is configured to communicate with a transponder reader complying with the ISO 14443 A standard.

6. The transponder power supply according to claim 1,
wherein the output stage is configured to provide the contribution to the supply current at a common VDD node;
wherein the transponder power supply further comprises a regular power supply circuit, and
wherein the emergency circuit and the regular power supply circuit are coupled in parallel in between an antenna interface terminal of the transponder power supply and the common VDD node of the transponder power supply.

7. A transponder power supply for providing a supply current based on an antenna input signal, the transponder power supply comprising:
an emergency circuit comprising a charging circuit, an emergency capacitor, and an output stage;
wherein the charging circuit is configured to charge the emergency capacitor based on the antenna input signal;
wherein the output stage comprises a step down converter circuit configured to provide a contribution to the supply current using a charge of the emergency capacitor;
wherein the output stage comprises a switch and an output control circuit;
wherein the switch and the step down converter circuit are coupled in parallel between the emergency capacitor and a common VDD node; and
wherein the output control circuit is configured to open the switch and activate the step down converter circuit if the voltage at the emergency capacitor is above a given switched-mode emergency capacitor threshold voltage, such that the contribution to the supply current provided at the common VDD node is based on a current provided by the step down converter circuit, and to close the switch and deactivate the step down converter circuit if the voltage at the emergency capacitor is equal to, or below, the given switched-mode emergency capacitor threshold voltage, such that the contribution to the supply current provided at the common VDD node is a discharge current of the emergency capacitor routed along the closed switch.

8. A transponder power supply for providing a supply current based on an antenna input signal, the transponder power supply comprising:
an emergency circuit comprising a charging circuit, an emergency capacitor,
a power control circuit, and an output stage;
wherein the charging circuit comprises a first charge pump and a second charge pump;
wherein the first charge pump and the second charge pump are configured to charge the emergency capacitor based on the antenna input signal to a maximum voltage, which is higher than a voltage of the antenna input signal;
wherein an output of the first charge pump and an output of the second charge pump are coupled to the emergency capacitor, such that an overall charge current of the emergency capacitor is a sum of a first charge current of the first charge pump and of a second charge current of the second pump;

wherein a maximum charge current provided by the first charge pump is at least by a factor of 10 larger than a maximum charge current provided by the second charge pump;

wherein the power control circuit is configured to activate the charging circuit and deactivate the output stage if the voltage of the antenna input signal is above a given input threshold voltage and to deactivate the charging circuit and activate the output stage if the voltage of the antenna input signal is equal to, or below, the given input threshold voltage;

wherein the power control circuit is configured to activate both, the first charge pump and the second charge pump after an increase of the antenna input signal from a voltage below the given input threshold voltage to a voltage above the given input threshold voltage, in order to charge the emergency capacitor to the maximum voltage, to subsequently deactivate both, the first charge pump and the second charge pump, and to keep the voltage at the emergency capacitor within a predetermined range using the second charge pump, while the voltage of the antenna input signal is above the given input threshold voltage;

wherein the first charge pump is configured to vary an amount of charge transferred from the antenna input signal to the emergency capacitor in dependence on a charge pump adjust signal;

wherein the second charge pump is configured to provide the second charge current by transferring charge from a common VDD node at which the contribution to the supply current is provided;

wherein the output stage comprises a switched capacitor step down converting circuit, a switch and an output control circuit;

wherein the switched capacitor step down converting circuit comprises a first converting stage and a second converting stage;

wherein the first converting stage, the second converting stage and the switch are coupled in parallel between the emergency capacitor and the common VDD node;

wherein the output control circuit is configured to open the switch, to activate the first and the second converting stage and to provide a non-overlapping clock signal to the first converting stage and the second converting stage, if a voltage at the emergency capacitor is above a given switched mode emergency capacitor threshold voltage, such that the contribution to the supply current provided at the common VDD node is based on a current provided switchably either by the first converting stage or the second converting stage and to close the switch and to deactivate the first converting stage and the second converting stage, if the voltage at the emergency capacitor is equal to, or below, the given switched mode emergency capacitor threshold voltage, such that the contribution to the supply current provided at the common VDD node is a discharge current of the emergency capacitor routed along the closed switch.

\* \* \* \* \*